United States Patent
Wang et al.

(10) Patent No.: US 12,037,762 B1
(45) Date of Patent: Jul. 16, 2024

(54) PRESTRESSED FISH-BELLY REACTION FRAME, PILE FOUNDATION BEARING CAPACITY DETECTION DEVICE AND APPLICATION THEREOF

(71) Applicants: BEIJING BUILDING RESEARCH INSTITUTE CORPORATION LIMITED OF CSCEC, Beijing (CN); BEIJING NO.6 CONSTRUCTION ENGINEERING QUALITY TEST DEPARTMENT CO., LTD, Beijing (CN); HEBEI XIONGAN KECHENG INSPECTION AND CERTIFICATION CO., LTD., Hebei (CN)

(72) Inventors: Changjun Wang, Beijing (CN); Hefei Li, Beijing (CN); Xupeng Zhang, Beijing (CN); Dandan Xu, Beijing (CN); Sen Pang, Beijing (CN); Rui Zhang, Beijing (CN); Jie Yang, Beijing (CN); Xiaohe Gan, Beijing (CN); Yingkun Wang, Beijing (CN); Xuewei Zhang, Beijing (CN); Xiaoxiao Li, Beijing (CN); Zihang Jiang, Beijing (CN)

(73) Assignees: BEIJING BUILDING RESEARCH INSTITUTE CORPORATION LIMITED OF CSCEC, Beijing (CN); BEIJING NO.6 CONSTRUCTION ENGINEERING QUALITY TEST DEPARTMENT CO., LTD, Beijing (CN); HESEL XIONGAN KECHENG INSPECTION AND CERTIFICATION CO., LTD., Hebei (CN)

( * ) Notice: Subject to any disclaimer, the term of this patent is extended or adjusted under 35 U.S.C. 154(b) by 0 days.

(21) Appl. No.: 18/398,291
(22) Filed: Dec. 28, 2023

(30) Foreign Application Priority Data

Aug. 22, 2023 (CN) .......................... 202311057543.2

(51) Int. Cl.
  *E02D 33/00* (2006.01)
  *G01M 99/00* (2011.01)
(52) U.S. Cl.
  CPC .......... *E02D 33/00* (2013.01); *G01M 99/007* (2013.01)
(58) Field of Classification Search
  CPC .............................. E02D 33/00; G01M 99/007
  See application file for complete search history.

(56) References Cited

U.S. PATENT DOCUMENTS

| | | | | |
|---|---|---|---|---|
| 3,946,601 | A * | 3/1976 | Yizhaki .................. | E02D 33/00 73/84 |
| 4,043,133 | A * | 8/1977 | Yegge ...................... | E02D 5/58 52/166 |

(Continued)

FOREIGN PATENT DOCUMENTS

| | | |
|---|---|---|
| CN | 108560562 A | 9/2018 |
| CN | 112647590 A | 4/2021 |
| CN | 218813926 U | 4/2023 |

*Primary Examiner* — Nathaniel T Woodward
*Assistant Examiner* — Philip L Cotey
(74) *Attorney, Agent, or Firm* — Cooper Legal Group, LLC

(57) ABSTRACT

A prestressed fish-belly reaction frame, a pile foundation bearing capacity detection device and application thereof, which includes: a core junction; a reaction beam including a plurality of beam units symmetrically arranged around the core junction with the core junction as a center, each beam unit has a first end and a second end, the first end is connected and fixed to the core junction, and the second end (Continued)

is connected and fixed to a pile top of an anchor pile when the pile foundation bearing capacity is detected; a prestressed assembly including a plurality of prestressed tendons, each prestressed tendon passes through an upper end of the core junction, a first end of each prestressed tendon is connected and fixed to the second end of one beam unit, a second end thereof is connected and fixed to the second end of the symmetrical beam unit.

6 Claims, 11 Drawing Sheets

(56) References Cited

U.S. PATENT DOCUMENTS

| | | | | |
|---|---|---|---|---|
| 4,081,992 | A * | 4/1978 | Aurora | G01N 3/00 73/84 |
| 4,634,316 | A * | 1/1987 | Cernak | E02D 5/46 405/230 |
| 6,311,567 | B1 * | 11/2001 | England | G01L 5/0038 73/806 |
| 6,363,776 | B1 * | 4/2002 | Reinert, Sr. | E02D 33/00 73/84 |
| 8,402,837 | B1 * | 3/2013 | Jones | E02D 33/00 73/788 |
| 2005/0074297 | A1 * | 4/2005 | Stoetzer | E02D 33/00 405/233 |
| 2011/0002744 | A1 * | 1/2011 | Tadros | E02D 5/54 405/232 |
| 2012/0107056 | A1 * | 5/2012 | Hecht | E02D 5/22 405/231 |
| 2016/0201289 | A1 * | 7/2016 | Silva Carceles | E02D 33/00 73/786 |
| 2016/0251819 | A1 * | 9/2016 | Dinh | E02D 33/00 73/784 |
| 2021/0246623 | A1 * | 8/2021 | Lammers | E02D 13/04 |

\* cited by examiner

PRESTRESSED FISH-BELLY REACTION FRAME, PILE FOUNDATION BEARING CAPACITY DETECTION DEVICE AND APPLICATION THEREOF

CROSS-REFERENCE TO RELATED APPLICATION

This application claims the priority and benefit of Chinese patent application serial no. 202311057543.2, filed on Aug. 22, 2023. The entirety of Chinese patent application serial no. 202311057543.2 is hereby incorporated by reference herein and made a part of this specification.

TECHNICAL FIELD

The disclosure relates to the technical field of underground engineering test, especially pile foundation detection, and in particular, to a prestressed fish-belly reaction frame, a pile foundation bearing capacity detection device and its application.

BACKGROUND ART

The pile foundation bearing capacity refers to the maximum load that a single pile can bear, under which the strength and stability of the foundation soil and the pile itself can be guaranteed, and the deformation is also within the tolerance range, so as to ensure the normal use of the structure. Static load test of pile foundation is a technology used in engineering to detect the pile foundation bearing capacity, common methods thereof include an anchor pile method and a stacking method.

In the anchor pile method, it is necessary to connect the reaction frame and the anchor pile together to provide a reaction force, which is commonly known as the anchor pile reaction beam device. In the anchor pile reaction beam device, several anchor piles, symmetrically arranged around the tested pile, are connected to the reaction frame through anchor bars, the reaction frame is lifted up by the jack on the pile top, and the reaction force is provided by the connected anchor piles, particularly, the value of the reaction force provided depends on the quantity of anchor piles, the strength of the reaction frame and the pull-out resistance of the connected anchor piles. The beams of the anchor pile reaction frame are generally steel beams with box section. The reaction frame of the anchor pile method test device generally includes a main beam and a secondary beam, wherein a force is applied to the pile top of the test pile through the jack, and the reaction force is transmitted to the reaction frame at the same time. The force transmitted by the reaction frame is then transmitted to anchor piles by the tension member of the anchor piles.

The reaction force of the stacking method is provided by the counterweight platform, which mainly includes a main beam, a beam support platform and a stacking load.

In engineering, the anchor pile reaction force method is greatly affected by the layout of the piles and the spacing between the piles. The span of the solid web steel beam is limited. When the spacing between the piles is larger, the solid web steel beam cannot be anchored with the anchor piles, therefore the application of the anchor pile method is limited, by which a single pile bears a larger pulling force, which will damage the engineering piles. Further, the anchor pile beam reaction method requires at least 4 piles around the test pile, to be anchored with the reaction frame. When all the piles on site cannot be anchored with the reaction frame, additional anchor piles must be erected around the test pile, to be anchored with the reaction frame, which has certain limitations in engineering applications.

When the anchor pile method is not applicable, the stacking method is generally used to test the bearing capacity of a single pile. This method has a long cycle, requires a large volume and weight of the stacking block, and the costs of transportation and transshipment are much higher than the anchor pile beam reaction force method. When the stacking capacity is large, the costs of transportation and transshipment are 2 to 3 times as much as the direct test costs. When the foundation pit is deep, the difficulty and costs of transportation and transshipment of the stacking blocks will be greatly increased, in addition, it is dangerous to set up a large crane at the edge of foundation pit. The stacking blocks consume more energy during transportation and transshipment, which results in greater carbon emissions and thus is extremely unfavorable to energy conservation and environmental protection.

Therefore, it is necessary to make targeted improvements to the existing pile foundation bearing capacity detection technology to meet the actual needs of various projects.

SUMMARY

In view of the shortcomings of existing technique, a prestressed fish-belly reaction frame is disclosed, Particularly, the prestressed fish-belly beam is used in the anchor pile method to detect the pile foundation bearing capacity, which can provide sufficient reaction force while ensuring the bearing capacity and connection stability of the prestressed fish-belly reaction frame during the test with the anchor pile method. Therefore, the problems of too large pile spacing and insufficient steel beam span in the anchor pile method, and the problems of difficult stacking of stacking blocks due to deep foundation pit, and high costs of transportation and transshipment of stacking blocks in the stacking method can be effectively solved. The prestressed fish-belly reaction frame has a simple structure, is easy to operate, and is low-carbon and environmentally friendly.

In order to achieve the above objectives, the following technical solution is adopted.

A prestressed fish-belly reaction frame includes: a core junction, the core junction is supported on a pile top of a test pile through a loading device when a pile foundation bearing capacity is detected; a reaction beam including a plurality of beam units, the plurality of beam units are symmetrically arranged around the core junction with the core junction as a center, each of the plurality of beam units has a first end and a second end, the first end is connected and fixed to the core junction, and the second end is connected and fixed to a pile top of an anchor pile when the pile foundation bearing capacity is detected; a prestressed assembly including a plurality of prestressed tendons, each of the plurality of prestressed tendons passes through an upper end of the core junction, a first end of each of the plurality of prestressed tendons is connected and fixed to the second end of one of the plurality of beam units, a second end of each of the plurality of prestressed tendons is connected and fixed to the second end of a respective one of the plurality of beam units arranged symmetrically with the one of the plurality of beam units, and at least one of the first end and the second end of each of the plurality of prestressed tendons is configured as a tensioning end.

The disclosure further proposes a pile foundation bearing capacity detection device, the prestressed fish-belly reaction frame is used by the pile foundation bearing capacity detection device, the pile foundation bearing capacity detection device further includes a loading device and a tie-rod device, wherein the loading device is arranged at the pile top of the test pile, and abuts against the core junction when the pile foundation bearing capacity is detected; and a first end of the tie-rod device is connected and fixed to a respective one of the plurality of beam units of the reaction beam, and a second end of the tie-rod device is connected to the pile top of the anchor pile.

The disclosure also proposes a method for detecting a pile foundation bearing capacity in a pile foundation bearing capacity test with an anchor pile method by means of the pile foundation bearing capacity detection device, including: S10, selecting a prestressed fish-belly reaction frame with a span and a height according to a test load and a pile spacing; S20, assembling the prestressed fish-belly reaction frame on site, and connecting the reaction beam and the core junction through bolts; S30, placing a jack in a midpoint of the pile top of the test pile, temporarily supporting the preliminary assembled prestressed fish-belly reaction frame, and anchoring a distal end of the reaction beam to a reinforcement on a pile head of an engineering pile, wherein the core junction is separated from the jack by a certain distance; S40, extending steel strands in two directions of the prestressed fish-belly reaction frame through through holes at tops of web members of the reaction beam and a channel for prestressed tendon of the core junction, anchoring the steel strands at an anchoring end, and tensioning the prestressed steel strands at tensioning ends in two directions at the same time; S50, carrying out a loading test after the prestressed tensioning is completed, wherein a cylinder of the jack is pushed out to contact a bottom surface of the core junction, and loading step by step according to loading requirements.

The prestressed fish-belly reaction frame, the pile foundation bearing capacity detection device and the method provided by the disclosure possess a simple structure, is easy to operate, and it is low-carbon and environmentally friendly. Compared with the anchor pile method, the problems of too large pile spacing and insufficient steel beam span in the anchor pile method can be effectively solved, by which any spans as required can be obtained while providing sufficient and stable reaction force, to fulfill the requirements of field use. Compared with the stacking method, the problems of difficult stacking of stacking blocks due to deep foundation pit, and high costs of transportation and transshipment of stacking blocks in the stacking method can be effectively solved, furthermore, the transportation cost will be greatly reduced, which has great advantages in energy saving and environmental protection. It should be understood that implementation of any embodiment of the disclosure does not mean that multiple or all of the beneficial effects described in the disclosure will be simultaneously possessed or achieved.

BRIEF DESCRIPTION OF THE DRAWINGS

In order to more clearly explain the embodiments of the disclosure or the technical solutions in the existing technique, the drawings to be used for describing the embodiments or the existing technique will be briefly introduced below. It is understood that the drawings in the following description are only exemplary. For those of ordinary skill in the art, other implementation drawings can be obtained based on the extension of the provided drawings without creative efforts.

The structures, proportions, sizes, etc. shown in this specification are only used to illustrate the contents disclosed in the specification for the understanding and reading of people familiar with this technology. They are not used to limit the conditions under which the disclosure can be implemented. Any structural modification, change in proportion or size adjustment shall still fall within the scope of the technical content disclosed in the disclosure as long as it does not affect the efficacy and purpose achieved by the disclosure.

In the drawings, the same or corresponding reference signs represent the same or corresponding parts.

DETAILED DESCRIPTION

Figure 1:
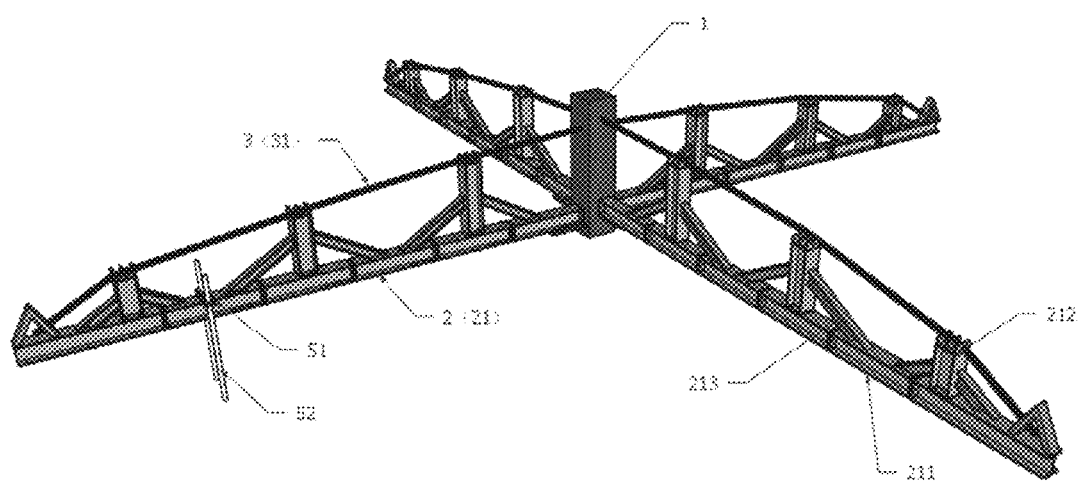
FIG. 1 is a schematic view of an overall structure of a prestressed fish-belly reaction frame of an embodiment according to the application.

For a better understanding of the purpose, technical solutions, and advantages of the embodiments of the present application, the present application will be further described below in details in conjunction with the embodiments with the drawings. Hereby, the illustrative embodiments of the disclosure and their descriptions are used to explain the disclosure, but not used to limit the disclosure.

In the description of the present application, it should be noted that, unless otherwise specified and limited, the terms "installation", "in connection with", "connection", and "fixation" should be understood broadly, for example, they can be fixed connection, detachable connection, or integrated connection; or, alternatively, it can be a mechanical connection or an electrical connection; or, alternatively, it can be directly connected, or indirectly connected via an intermediate medium, or it can be internal communication between two components or interactive relationship between two components. For those skilled in the art, the specific meanings of the above terms in the present application can be understood in particular circumstances.

It should be understood that the terms "include/comprise", "consist of," or any other variation are intended to cover a non-exclusive inclusion, such that a product, apparatus, process or method that includes a list of elements not only includes those elements, but also, if necessary, other elements not expressly listed or elements inherent to the product, equipment, process or method. Without further limitation, elements defined by the statements "include/comprise" or "consist of" do not exclude the presence of additional identical elements in a product, device, process or method that includes the stated elements.

In the description of the present application, it should be understood that, the terms "up", "down", "left", "right", "top", "bottom", "in", "out", etc. indicate the orientation or positional relationship based on the orientation or positional relationship shown in the drawings, only for the convenience of describing the present application and simplifying the description, rather than indicating or implying that a device or component referred to must have a specific orientation, or be constructed and operated in a specific orientation, and therefore should not be understood as a limitation to the present application.

In addition, the terms "first" and "second" are used for descriptive purposes only and cannot be understood as indicating or implying relative importance or implicitly indicating the quantity of indicated technical features. Therefore, features defined with "first" and "second" may explicitly or implicitly include one or more of these features. In the description of the disclosure, "plurality" means two or more than two, unless otherwise explicitly and specifically limited.

In order to overcome the shortcomings of the anchor pile method and the stacking method for detecting pile foundation bearing capacity in existing engineering, a prestressed fish-belly beam is applied to the engineering of detecting pile foundation bearing capacity by the anchor pile method. A reaction frame of bi-directional cross prestressed fish-belly beam is provided, to effectively solve the problems of insufficient steel beam span caused by excessive pile spacing in the anchor pile method, difficulty in stacking the stacking blocks due to the deep foundation pit and high costs of transportation and transshipment of the stacking blocks in the stacking method.

Referring to FIG. 1, a prestressed fish-belly reaction frame mainly includes a core junction 1, a reaction beam 2, and prestressed assemblies 3.

The so-called fish-belly type or fish-belly beam is a beam designed to increase the bending strength and save material. The middle section thereof is large and gradually decreases toward two ends of the beam, whose shape is similar to a fish-belly. Its purpose is to increase the bending strength and save material.

The core junction 1 is located at the center of the reaction frame. During the detection of the pile foundation bearing capacity, the core junction is supported on the pile top of the test pile through the loading device. As the core connection structure of the entire reaction frame, the core junction provides the connection and support at the junction, which should not only ensure the connection strength at the junction but also ensure the stable supply of sufficient reaction force when the loading device applies a jacking force. The specific structure of the core junction 1 would not be defined here, as long as it meets the usage requirements.

The reaction beam 2 is a kind of beam structure, which includes a plurality of beam units 21. The plurality of beam units 21 are symmetrically arranged around the core junction 1 with the core junction 1 as the center, for example, in a radial way. Each of the beam units 21 has a first end and a second end. The first end is connected and fixed to the core junction 1, and the second end is connected and fixed to the pile top of the anchor pile during the detection of the pile foundation bearing capacity. The so-called first end can be understood as the proximal end or the end close to that of other beam units, and the second end can be understood as the distal end or the end far away from that of other beam units. When detecting the pile foundation bearing capacity, the second end of the beam unit 21 is connected and fixed to the pile top of the anchor pile, such that the entire reaction beam 2 is firmly fixed, so as to generate a reaction force on the loading device and the test pile. It should be understood that the so-called second end is connected and fixed to the pile top of the anchor pile during the detection of pile foundation bearing capacity. This second end is not limited to the tail end of the second end of the beam unit 21, which can be the tail end or the point at a certain distance inward (namely toward the core junction 1) from the tail end depending on the actual factors such as the length of the beam unit 21, the spacing of anchor piles, etc., which is determined by the stress design when necessary.

The prestressed assembly 3 applies prestress to the reaction frame, to enhance the bearing capacity of the entire reaction frame. The prestressed assembly 3 includes a plurality of prestressed tendons 31. The prestressed tendons 31 are optionally prestressed steel strands. The prestressed tendons 31 are arranged over the whole length of the beam unit 21 on two sides of the core junction 1. Each of the plurality of prestressed tendons 31 passes through the upper end of the core junction 1. The first end of the prestressed tendon is connected and fixed to the second end of one of the beam units 21, while the second end thereof is connected and fixed to the second end of the symmetrical one of the beam units 21. At least one of the first end and the second end of the prestressed tendon 31 acts as a tensioning end. As shown in FIG. 1, an anchor in form of a tripod is provided at the distal end of the beam unit 21. Both ends of the prestressed tendon 31 are connected to the anchor. As shown in the figure, one end is configured as the anchoring end, and the other end is configured as the tensioning end. The prestressed tendons 31 are tensioned on one side, whose two ends can also be configured as tensioning ends for tensioning on both sides.

By means of the prestressed fish-belly reaction frame structure of the disclosure, on the one hand, the problem of excessive pile spacing and insufficient steel beam span in the anchor pile method can be effectively solved by reasonably determination of the length of the beam unit, by which sufficient reaction force can be provided after the prestress is applied; on the other hand, the problems of difficult stacking of stacking blocks under large loading and high costs of transportation and transshipment in the stacking method can been effectively solved.

Figure 2:
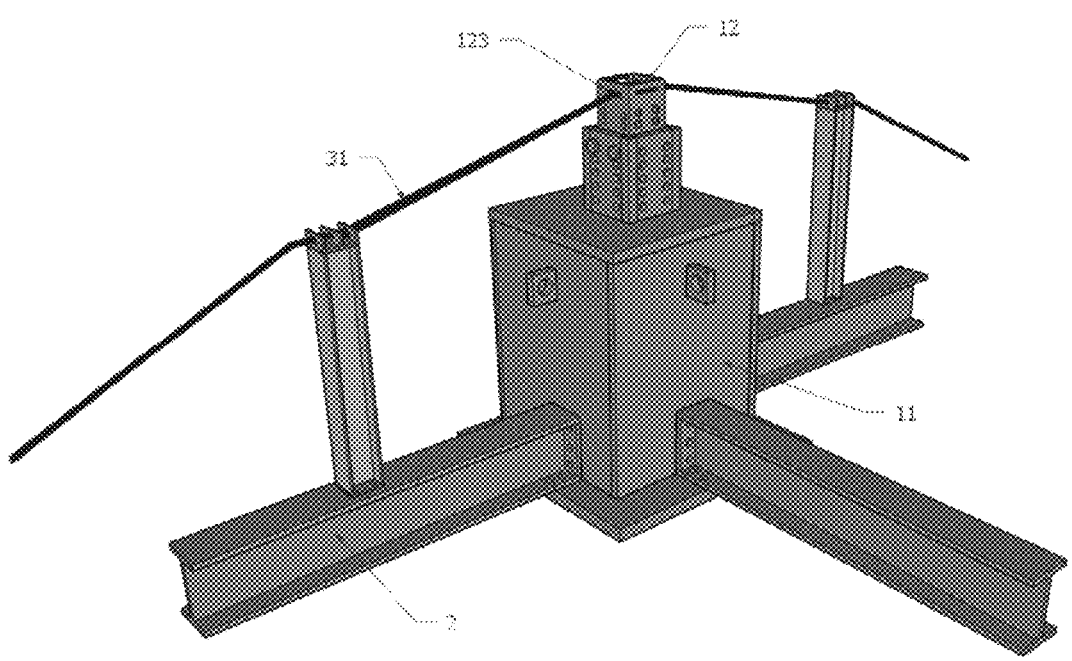
FIG. 2 is a schematic view of a core junction connection structure according to the embodiment of the disclosure.
Figure 3:
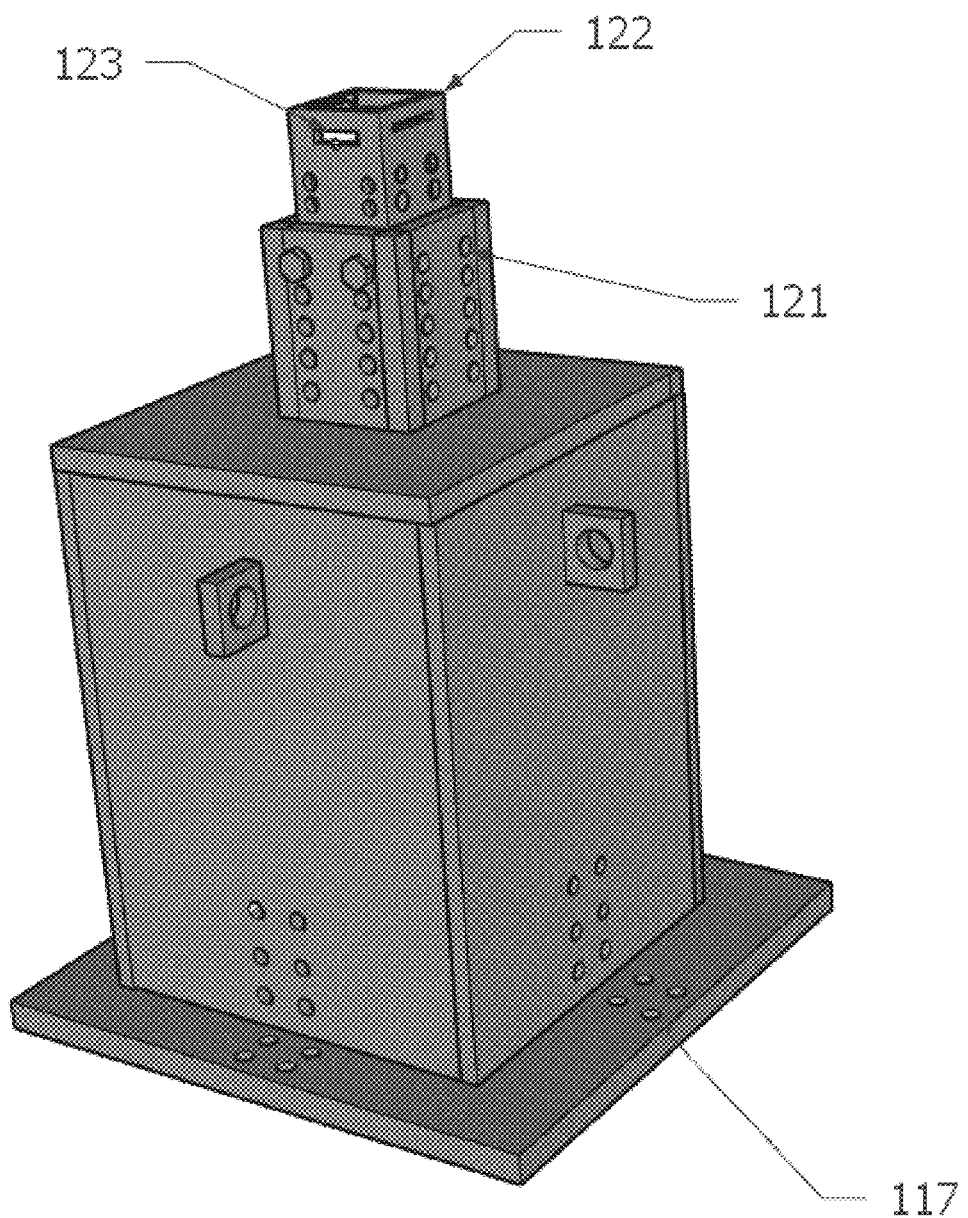
FIG. 3 is a schematic view of an overall structure of the core junction according to the embodiment of the disclosure.

In some embodiments, the disclosure provides a core junction structure applied to the prestressed fish-belly reaction frame. Referring to FIGS. 2-3, the core junction 1 includes a support base 11 and a base of prestressed tendon 12. The support base 11 is supported on a loading device during the detection of pile foundation bearing capacity. The first ends of the plurality of beam units 21 are connected and fixed on the sidewall of the support base 11. In this embodiment, the four sidewalls of the support base 11 are all connected with the beam units 21, to form a cross-shaped reaction frame. The base of prestressed tendon 12 is arranged on the top of the support base 11 and configured with a channel for prestressed tendon 123 thereon (referring to FIGS. 3-4), through which the plurality of prestressed tendons 31 can pass. The core junction 1 is designed to have a separate structure, to facilitate manufacturing, handling and installation, which also provides convenience for subsequent adjustment of the installation height of the prestressed tendon 31. The channel for prestressed tendon 123 is optionally designed as a transverse groove, which allows the prestressed tendon 31 to be finely adjusted in the transverse positon therein, such that the prestressed tendon is arranged as centrally as possible in the center of the beam unit 21.

In some embodiments, the disclosure provides a support base. Referring to FIGS. 4-7. The support base 11 is a multi-cavity support base embedded with concrete, which includes a top steel plate 111, a bottom steel plate 112, an outer steel plate 113 and an embedded steel plate frame 114. The top steel plate 111, the bottom steel plate 112 and the outer steel plate 113 are welded at the top, bottom and in the periphery to form a box-shaped structure. The embedded steel plate frame 114 is welded and fixed inside the box-shaped structure, to provide the core junction with sufficient strength and stiffness.

The embedded steel plate frame 114 is welded by a plurality of criss-crossing embedded steel plates. Internal cavities 115 are formed between adjacent embedded steel plates. At least part of the internal cavities 115 is embedded with solid grouted concrete 116. By embedding solid grouted concrete 116 in part of the internal cavities 115, and by means of the box-shaped structure formed by the peripheral steel plates, a structure similar to a concrete-filled steel tube embedded with profile steel can be formed. In this way, sufficient compressive strength and stiffness can be obtained, to ensure that the core junction 1 will not be squeezed and damaged when the loading device exerts a jacking force.

Figure 6:
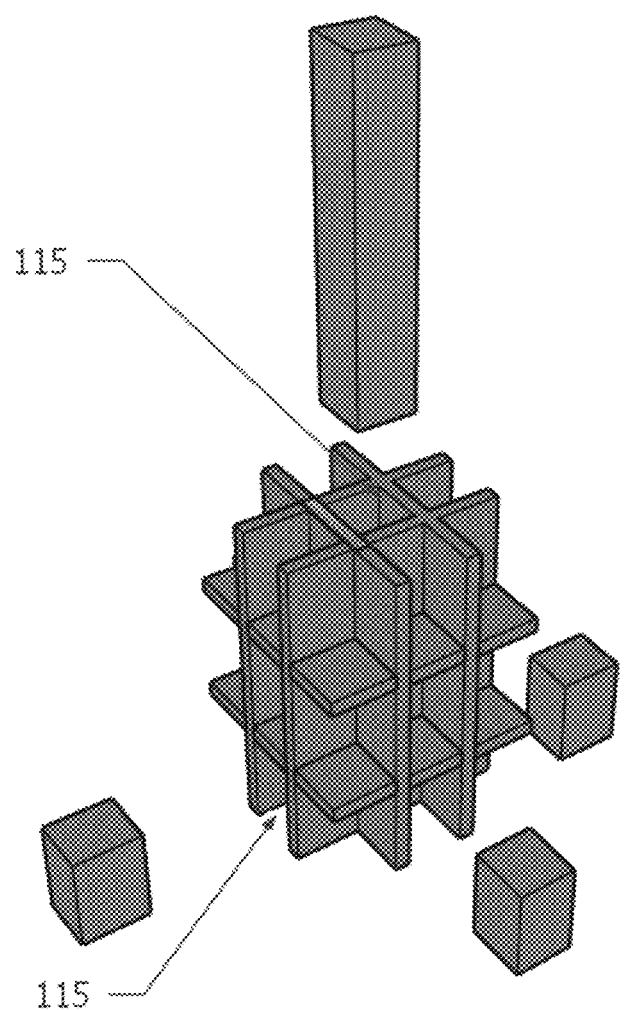
FIG. 6 is an exploded schematic view of an embedded steel plate frame according to the embodiment of the disclosure.
Figure 7:
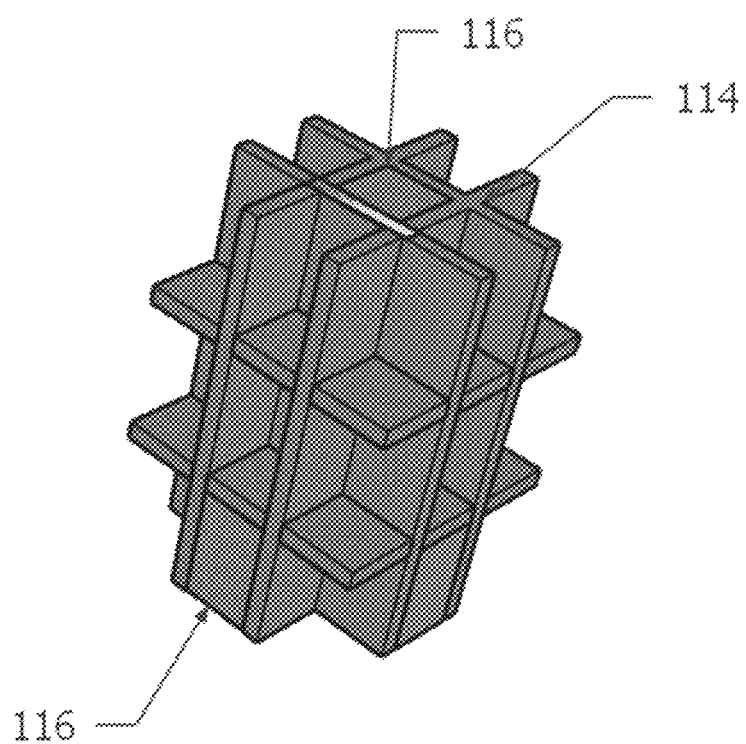
FIG. 7 is a schematic view of the embedded steel plate frame according to the embodiment of the disclosure.

In some embodiments, the embedded steel plate frame 114 is a three-tiered embedded steel plate frame, which is formed by staggered welding of each two embedded steel plates in the longitudinal, transverse and height directions, so as to form a top tier, a middle tier and a bottom tier. The solid grouted concrete 116 is embedded in and fills the internal cavity 115 in the center and the internal cavity 115 in the middle of the bottom tier. Pegs can be arranged in the internal cavity 115 in the center, as shown in FIGS. 6-7. Not all the internal cavities 115 are filled with the solid grouted concrete 116, otherwise the entire core junction 1 will be too heavy, which is not conducive to the handling, the assembly and the connection. However, the solid grouted concrete 116 in this example is not arranged randomly, but is selectively embedded in the internal cavity 115 in the center of the embedded steel plate frame 114. As shown in FIG. 7, the solid grouted concrete 116 is arranged over the entire length of the internal cavity 115 in the center, that is, from the top to the bottom. Therefore, the compressive bearing capacity of the core junction 1 can be effectively enhanced in the center, which ensures the safety of the structure when the loading device exerts a jacking force at the center. At the same time, the corresponding outer steel plate 113 here must be bolted to the beam unit 21. The solid grouted concrete 116 selectively embedded in the internal cavity 115 in the middle of the bottom tier of the embedded steel plate frame 114 can provide sufficient strength at this junction position, so as to ensure that tension and shear failure will not occur here.

In the specific producing process, the embedded steel plate frame 114 is welded at first, after the welding is completed, concrete is grouted into the internal cavity 115, and the top steel plate 111 and the bottom steel plate 112 are welded after the concrete is solidified and the form is removed.

Figure 4:
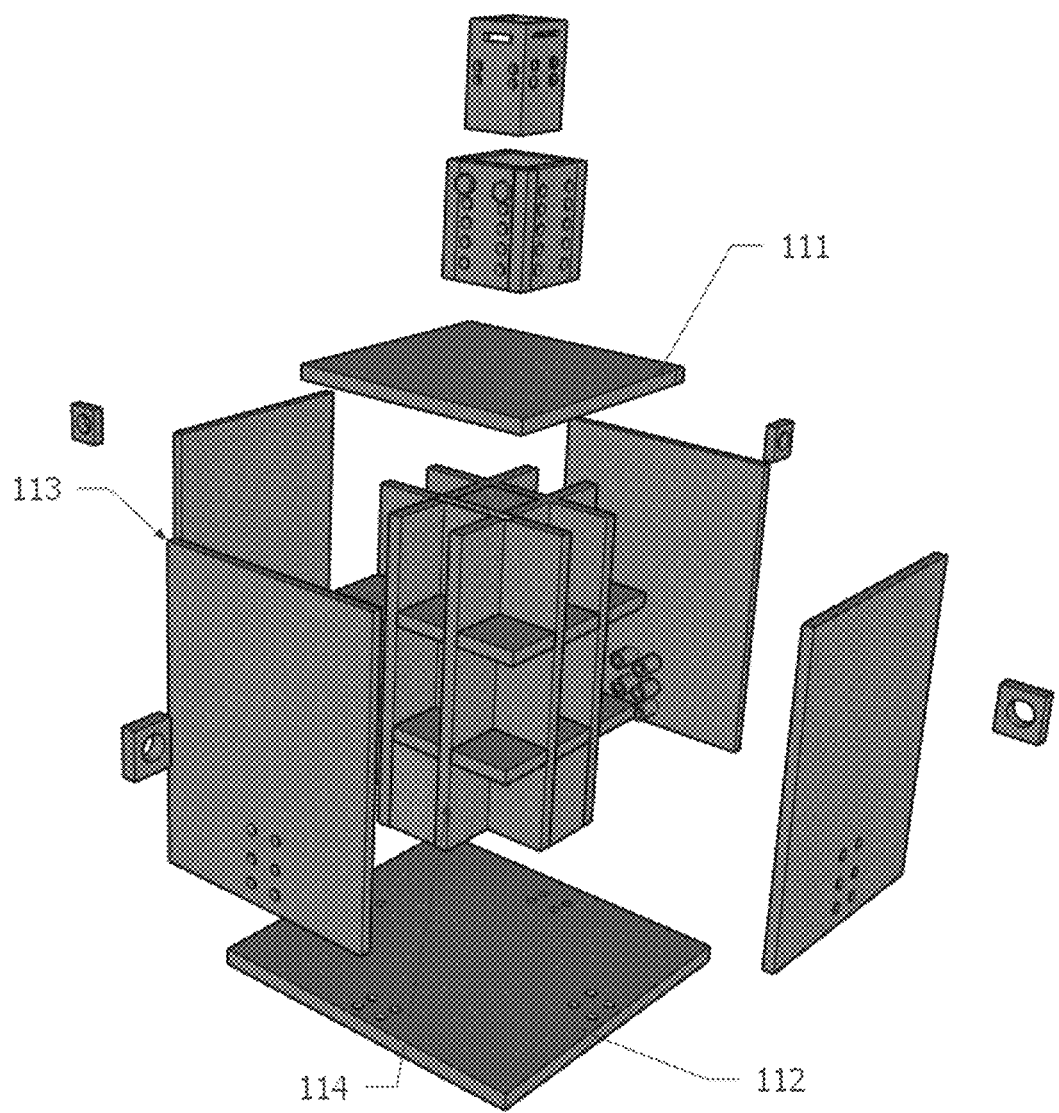
FIG. 4 is an exploded schematic view of the core junction according to the embodiment of the disclosure.
Figure 5:
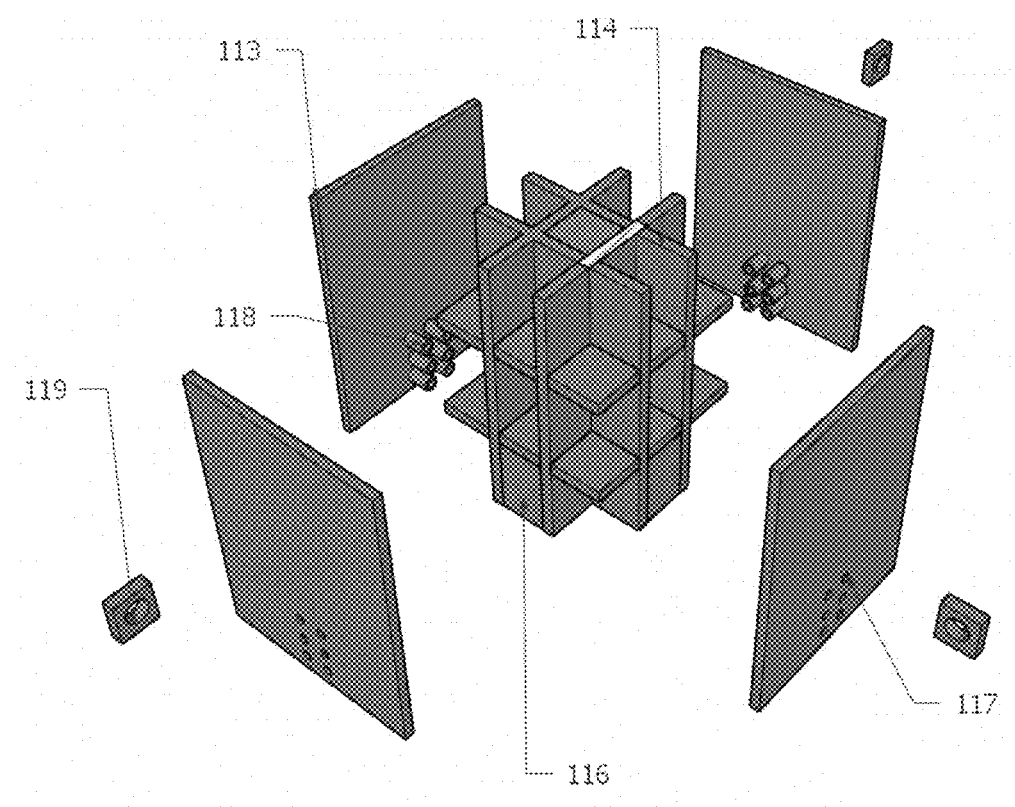
FIG. 5 is an exploded schematic view of a support base according to the embodiment of the disclosure.

As shown in FIGS. 4-5, the outer steel plate 113 is optionally a whole flat steel plate, and is welded and fixed with the top steel plate 111 and the bottom steel plate 112 on the periphery, and is welded and fixed internally with the exposed contact points of the embedded steel plate frame 114. In this way, a firm core junction 1 can be obtained while facilitating the processing and production. Continuing to refer to FIGS. 4-5, bolt holes 117 are predefined in the outer steel plate 113 for connecting the beam units 21 through bolts. Nuts 118 are welded on the inner sidewall of the outer steel plate 113 corresponding to the bolt holes 117. The center of the nut 118 is aligned with the center of the bolt hole 117. The nuts 118 are pre-embedded in the solid grouted concrete 116 in the middle of the bottom tier of the embedded steel plate frame 114. Nut 118 is reserved for a certain length, so that the nut has a sufficient length to be embedded in the concrete. When installing the beam unit 21, the end of the beam unit 21 is predefined with a corresponding bolt hole, which is aligned to the bolt hole 117. The bolt passes through the bolt hole 117 and is connected and fixed to the nut 118 on the inner sidewall. The nut 118 is pre-embedded in the solid grouted concrete 116, so as to provide a firm connection strength between the beam unit 21 and the core junction 1.

In order to facilitate the assembly of the entire core junction 1, lifting rings 119 are welded at the upper center of the outer steel plate 113. Each side can be welded with one lifting ring.

In addition, referring to FIGS. 3-4 again, the bottom steel plate 112 is also predefined with bolt holes 117 at the positions corresponding to the beam unit 21. Besides the end surface of the beam unit 21 is bolted to the outer steel plate 113, the bottom surface thereof is also bolted to the bottom steel plate 112, so as to further enhance the connection strength between the beam unit 21 and the core junction 1, thereby ensuring the effectiveness of the entire reaction frame during the test.

Figure 8:
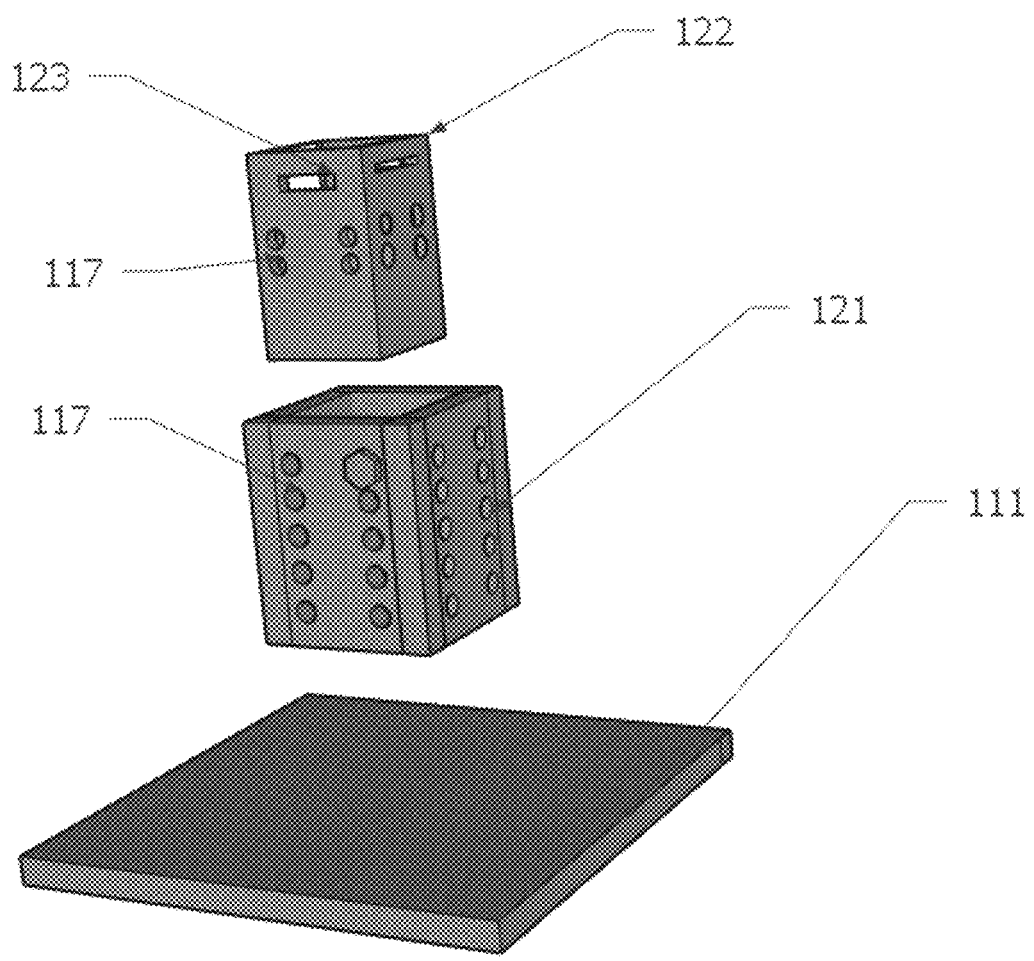
FIG. 8 is an exploded schematic view of a base of prestressed tendon according to the embodiment of the disclosure.
Figure 9:
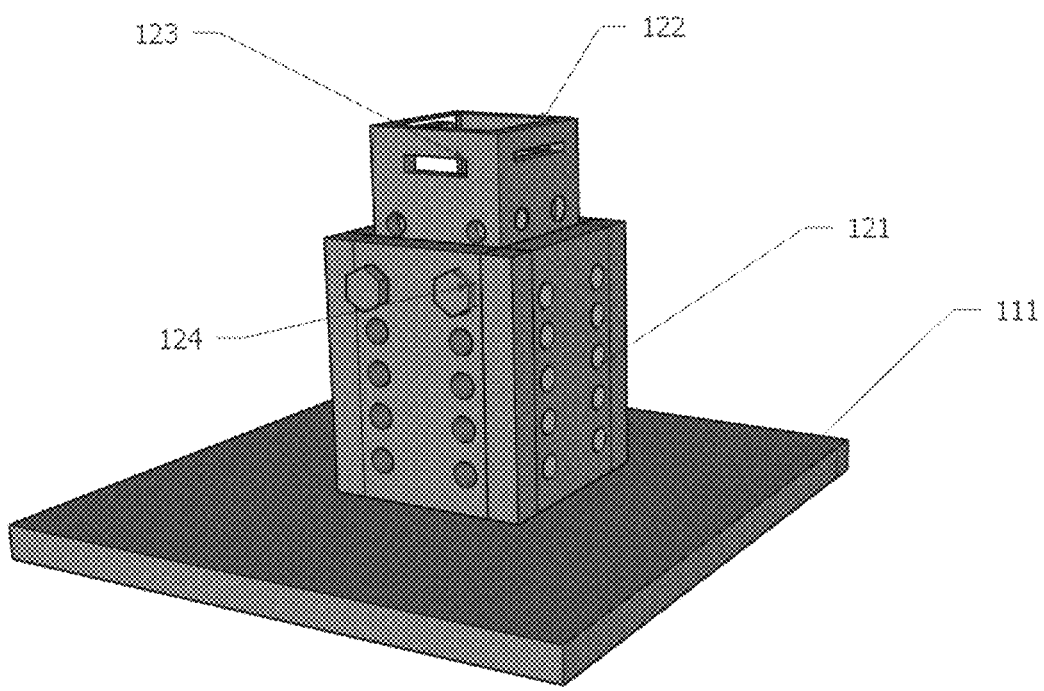
FIG. 9 is a schematic view of the base of prestressed tendon according to the embodiment of the disclosure.

In some embodiments, the disclosure provides a base of prestressed tendon. As shown in FIGS. 8-9, the base of prestressed tendon 12 is an adjustable base of prestressed tendon, which includes an outer cylinder 121 and an inner cylinder 122. In particular, the side wall of the outer cylinder 121 is configured with a plurality of rows of bolt holes 117 in height direction. The side wall of the inner cylinder 122 is correspondingly configured with at least one row, in this embodiment two rows of bolt holes 117 in height direction, to obtain a stable connection. The inner cylinder 122 obtains a predetermined height in such a way, that the bolts 124 are inserted and fixed in the corresponding bolt holes 117. The channel for prestressed tendon 123 is defined in the upper part of the side wall of the inner cylinder 122. It is convenient to adjust the height of the central position of the prestressed tendon 31 by adjusting the relative installation height of the inner cylinder 122 relative to the outer cylinder 121. When the load for detecting pile foundation and pile spacing are different, the span and height of the prestressed fish-belly beam will be different, which results in different heights of the steel strands in the middle of the core junction. According to the disclosure, the height of the channel can be adjusted by adjusting the bolt fastening positions of the inner cylinder 122 and the outer cylinder 121, so as to ensure that the height of the core junction can meet the assembly requirements under different test conditions.

In some embodiments, the disclosure provides a reaction beam. Referring to FIG. 1 again, each of the plurality of beam units 21 of the reaction beam 2 includes a lower chord 211, web members 212 and diagonal bars 213. The lower chord 211, the web members 212 and the diagonal bars 213 constitute a frame beam structure, which provides guarantee for obtaining an effective reaction force when loading. According to the layout length and the requirement of prestress of the lower chord 211, a plurality of web members 212 are provided. The plurality of web members 212 are supported on the lower chord 211. The heights of the plurality of web members 212 decrease gradually from the core junction 1 to the second end (i.e., the distal end) of the beam unit 21. A through hole is defined at the top of the web member 212 for being passed through by the prestressed tendon 31. In this way, a fish-belly structure with a high middle and low ends is formed. The prestressed force of the prestressed tendons 31 is applied to core junction 1 in the middle.

The diagonal bar 213 is supported between the web member 212 and the lower chord 211 at two sides of the web member 212, so as to ensure the stability of the top end of the web member 212 when being tensioned due to the prestress.

Optionally, referring to FIG. 1, the lower chord 211, the web member 212 and the diagonal bar 213 are all configured as I-beams. The lower chord 211 has an upper flange, a lower flange and a web. I-beam is easy to manufacture and install, and can provide relative greater bearing capacity and torsion moment on the cross-section.

Figure 10:
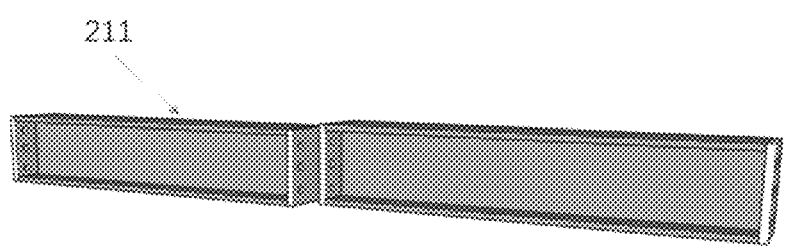
FIG. 10 is a schematic view of an assembled I-beam according to the embodiment of the disclosure.

Continuing to refer to FIG. 1 in combination with FIG. 10, the lower chord 211 is formed by assembling a plurality of I-beams with bolts. The plurality of I-beams are welded with end plates at their ends. The end plates are configured with bolt holes. Adjacent I-beams are connected through bolts. The lower chord, the web member and the diagonal bar of the prestressed fish-belly beam all have I-shaped cross sections. All nodes are connected by bolts. The lower chord is formed by assembling a plurality of I-beams. The size and module of the I-beam is determined depending on the pile spacing. By assembling a plurality of beams, any required length of the beam unit 21 can be obtained. The arrangement can be flexible on site according to the spacing between anchor piles. It is no longer limited by the defects of too large pile spacing and insufficient steel beam span in the anchor pile method.

Figure 11:
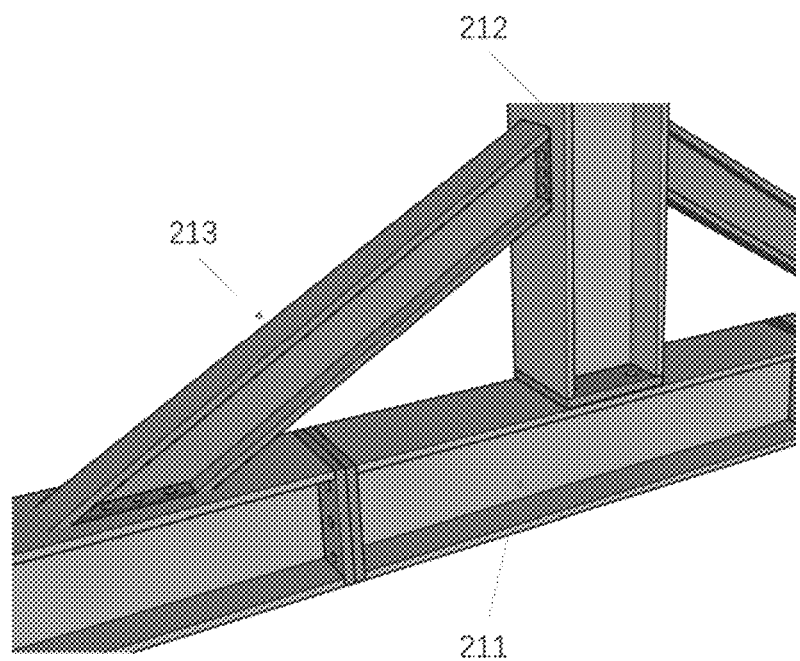
FIG. 11 is a schematic view of the connection node for the beam unit according to the embodiment of the disclosure.

Continuing to refer to FIG. 1 in combination with FIG. 11, the bottom end of the web member 212 is bolted and fixed to the lower chord 211. Two ends of the diagonal bar 213 are bolted and fixed to the lower chord 211 and the web member 212, respectively. It is only necessary to weld endplates with through holes on the ends of the bars in advance through bolted connection. A quick assembly can be realized on site by using bolts, thereby avoiding the trouble of welding operations.

Figure 12:
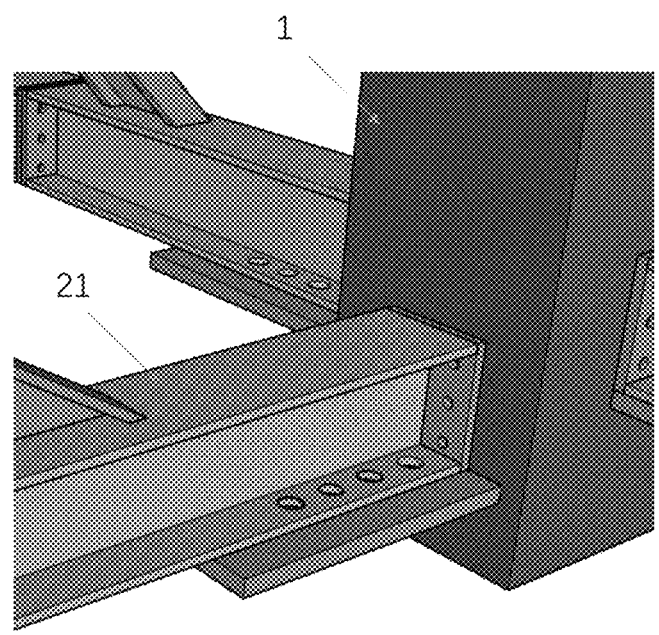
FIG. 12 is a schematic view of a core node of the beam unit according to the embodiment of the disclosure.

FIG. 12 shows the bolted connection state between the core junction 1 and the beam unit 21. The end of the beam unit 21 is welded with an end plate with holes, through which the end of the beam unit is bolted to the core junction. At the same time, the lower flange of the lower chord 211 is bolted to the bottom steel plate 112 of the core junction 1, as shown in FIG. 2. It should be noted that the core junction 1 in FIG. 12 is only for illustration.

Prestressed fish-belly beams are mostly applied in foundation pit support engineering. In the present disclosure, the prestressed fish-belly beam is applied to the engineering of detecting the pile foundation bearing capacity by the anchor pile method for the first time, by which a reaction frame of bi-directional cross prestressed fish-belly beam is provided. The fish-belly reaction frame can be produced in a modular manner. The fish-belly beams with different spans are assembled according to the layout and spacing of the pile foundations on site. The fish-belly reaction frame can be assembled with bolts on site and is easy to install. The fish-belly beam has a Lattice structure with small cross-section and light weight. The on-site hoisting cost is low. The existing engineering piles on site can be fully utilized without erecting additional anchor piles. The test piles of engineering can be randomly selected for the bearing capacity test. The fish-belly beam possesses a high rigidity, therefore, it is deformed only slightly during loading. All components can be reused, which can save resources sufficiently.

Figure 13:
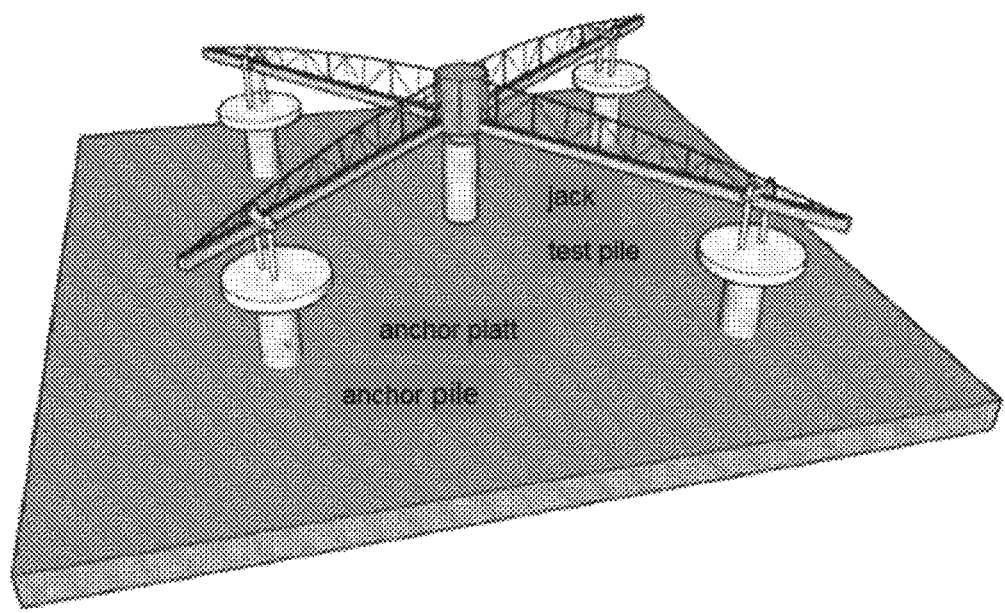
FIG. 13 is a schematic view of the pile foundation bearing capacity detection device according to the embodiment of the disclosure in using state.

Continuing to refer to FIG. 13, the disclosure provides a pile foundation bearing capacity detection device based on the above-mentioned prestressed fish-belly reaction frame, by which the above-mentioned prestressed fish-belly reaction frame is adopted, and which further includes a loading device and a tie-rod device. The loading device is arranged at the pile top of the test pile, and abuts against the core junction when the pile foundation bearing capacity is detected. The first end of the tie-rod device is connected and fixed to the beam unit of the reaction beam, and the second end thereof is connected to the pile top of the anchor pile.

For example, the loading device can be a jack. The lower end of the jack abuts against the pile top of the test pile. A pile pad can be additional provided on the pile top of the test pile, to avoid damage to the pile head during loading. The upper end of the jack abuts against the core junction.

In combination with FIG. 1, the tie-rod device can include, for example, a pillow 51 and a tie-rod 52. The pillow 51 spans the beam unit 21 and is connected and fixed to two tie-rods 52. The lower ends of the two tie-rods 52 are connected to the anchor pile. An anchor plate can be arranged at the pile top of the anchor pile to be connected and fixed to the tie-rod 52.

The reaction beam 2 of the present disclosure optionally includes four beam units 21. The four beam units 21 form a bi-directional cross-shaped reaction beam 2 at the periphery of the core junction 1. The four beam units 21 are respectively connected and fixed to four anchor piles through tie-rod devices. The bi-directional cross-shaped prestressed fish-belly beams are connected through the core junction, which not only ensures that the reaction frame can provide sufficient reaction force, but also ensures the stability of the reaction frame, so as to avoid instability of the reaction frame out of plane.

It should be noted that, the anchor pile can be the same as the test pile, which are both engineering piles, or can be separately disposed anchor pile for the purpose of detection test. If the engineering piles are allowed, the engineering piles will be used as anchor piles first, which is determined depending on the actual situation on site.

Continuing to refer to FIG. 13, the pile foundation bearing capacity detection device according to the disclosure is applied to the pile foundation bearing capacity test with the anchor pile method, including:

Firstly, selecting fish-belly reaction frames with different spans and heights according to different test loads and pile spacings;

secondly, assembling the reaction frames on site, and connecting rods of the reaction frames and the core junction through bolts;

thirdly, placing the jack at the midpoint of the test pile, temporarily supporting the assembled reaction frame with buttresses, and anchoring four ends of the reaction frame to a reinforcement on a pile head of an engineering pile, particularly, the core junction is spaced from the top surface of the cylinder of the jack cylinder by a certain distance at this time.

fourthly, extending the steel strands in two directions of the reaction frame through the through holes in the web members and the channel for prestressed tendon in the core junction, anchoring the steel strands at the anchoring end, and tensioning the prestressed steel strands at the tensioning ends in the two directions at the same time;

lastly, conducting a loading test after the prestressed tensioning is completed, particularly, the jack cylinder is pushed out to contact the bottom surface of the core junction, and loading step by step according to the design requirements of loading.

The embodiments of the disclosure have been described above. The above description is illustrative, not exhaustive, and is not limited to the disclosed embodiments. Many modifications and variations will be apparent to those skilled in the art without departing from the scope and spirit of the described embodiments.

What is claimed is:

1. A prestressed fish-belly reaction frame, comprising:
   a core junction, the core junction is configured to be supported on a pile top of a test pile through a loading device when a pile foundation bearing capacity is detected;
   a reaction beam comprising four beam units, the four beam units are symmetrically arranged around the core junction with the core junction as a center, so as to form a bi-directional cross-shaped reaction beam, each of the four beam units has a first end and a second end, the first end is configured to be connected and fixed to the core junction, and the second end is configured to be connected and fixed to a pile top of an anchor pile when the pile foundation bearing capacity is detected; and
   a prestressed assembly comprising a plurality of prestressed tendons, each of the plurality of prestressed tendons passes through an upper end of the core junction, a first end of each of the plurality of prestressed tendons is connected and fixed to the second end of one of the four beam units, a second end of each of the plurality of prestressed tendons is connected and fixed to the second end of a respective one of the four beam units arranged symmetrically with the one of the four beam units, and at least one of the first end or the second end of each of the plurality of prestressed tendons is configured as a tensioning end; wherein
   the core junction comprises a support base and a base of prestressed tendon, the support base is configured to be supported on the loading device when the pile foundation bearing capacity is detected, the first ends of the four beam units are connected and fixed on sidewalls of the support base; the base of prestressed tendon is arranged on a top of the support base and configured with a channel for prestressed tendon, and the plurality of prestressed tendons pass through the channel for prestressed tendon;
   the support base is a multi-cavity support base with embedded concrete, the support base comprises a top steel plate, a bottom steel plate, an outer steel plate and an embedded steel plate frame, the embedded steel plate frame is formed by a plurality criss-crossing embedded steel plates, internal cavities are formed between adjacent ones of the plurality criss-crossing embedded steel plates, the top steel plate, the bottom steel plate and the outer steel plate are respectively welded and fixed to a periphery of the embedded steel plate frame, and at least part of the internal cavities is embedded with solid grouted concrete;
   the base of prestressed tendon is an adjustable base of prestressed tendon, which comprises an outer cylinder and an inner cylinder, a sidewall of the outer cylinder is configured with a plurality of rows of first bolt holes in a height direction, and a sidewall of the inner cylinder is correspondingly configured with at least one row of second bolt holes in the height direction, wherein the inner cylinder is configured to be located at a predetermined height in such a way, that bolts are inserted and fixed in corresponding bolt holes of the plurality of rows of first bolt holes and the at least one row of second bolt holes, and the channel for prestressed tendon is defined in an upper part of the sidewall of the inner cylinder; and
   the embedded steel plate frame is a three-tiered embedded steel plate frame, which is formed by staggered welding of each two of the plurality criss-crossing embedded steel plates in longitudinal direction, transverse direction and the height direction, and the solid grouted concrete is embedded in and fills an internal cavity in a center of the internal cavities and a second internal cavity in a middle of a bottom tier of the internal cavities.

2. The prestressed fish-belly reaction frame according to claim 1, wherein
   third bolt holes are defined in the outer steel plate for connecting the four beam units through second bolts, nuts welded on an inner sidewall of the outer steel plate correspond to the third bolt holes, and the nuts are pre-embedded in the solid grouted concrete.

3. The prestressed fish-belly reaction frame according to claim 1, wherein
   each of the four beam units of the reaction beam comprises a lower chord, web members and diagonal bars, the web members are supported on the lower chord, heights of the web members decrease gradually from the core junction toward the second end of the respective one of the four beam units, a through hole is defined at a top of each of the web members, the prestressed assembly passes through the through hole, each of the web members is provided with two of the diagonal bars at two sides, and each of the diagonal bars is supported between each of the web members and the lower chord.

4. The prestressed fish-belly reaction frame according to claim 3, wherein
   the lower chord, the web members and the diagonal bars are all I-beams;
   the lower chord is assembled by a plurality of I-beams together with second bolts;
   bottom ends of the web members are fixed to the lower chord with third bolts; and
   two ends of each of the diagonal bars are respectively fixed to the lower chord and a respective one of the web members with fourth bolts.

5. A pile foundation bearing capacity detection device, wherein the prestressed fish-belly reaction frame according to claim 1 is used by the pile foundation bearing capacity detection device, the pile foundation bearing capacity detection device further comprises the loading device and a tie-rod device, wherein
   the loading device is configured to be arranged at the pile top of the test pile, and is configured to abut against the core junction when the pile foundation bearing capacity is detected; and
   a first end of the tie-rod device is connected and fixed to a respective one of the four beam units of the reaction beam, and a second end of the tie-rod device is connected to the pile top of the anchor pile.

6. A method for detecting the pile foundation bearing capacity in a pile foundation bearing capacity test with an anchor pile method by means of the pile foundation bearing capacity detection device according to claim 5, comprising:
- S10, selecting a prestressed fish-belly reaction frame with a span and height according to a test load and a pile spacing;
- S20, assembling the prestressed fish-belly reaction frame on site, and connecting the reaction beam and the core junction through second bolts to yield a preliminary assembled reaction frame;
- S30, placing a jack in a midpoint of the pile top of the test pile, temporarily supporting the preliminary assembled reaction frame, and anchoring the second end of the reaction beam to a reinforcement on a pile head of an engineering pile, wherein the core junction is separated from the jack by a certain distance;
- S40, extending steel strands in two directions of the prestressed fish-belly reaction frame through through holes at tops of web members of the reaction beam and the channel for prestressed tendon of the core junction, anchoring the steel strands at an anchoring end to yield prestressed steel strands, and performing prestressed tensioning by tensioning the prestressed steel strands at tensioning ends in two directions at a same time; and
- S50, carrying out a loading test after the prestressed tensioning is completed, wherein a cylinder of the jack is pushed out to contact a bottom surface of the core junction, and loading step by step according to loading requirements.

\* \* \* \* \*

UNITED STATES PATENT AND TRADEMARK OFFICE
CERTIFICATE OF CORRECTION

| | | |
|---|---|---|
| PATENT NO. | : 12,037,762 B1 | Page 1 of 1 |
| APPLICATION NO. | : 18/398291 | |
| DATED | : July 16, 2024 | |
| INVENTOR(S) | : Changjun Wang et al. | |

It is certified that error appears in the above-identified patent and that said Letters Patent is hereby corrected as shown below:

On the Title Page

At Column 1, item (73) Assignees, "HESEL XIONGAN KECHENG INSPECTION AND CERTIFICATION CO., LTD." should read -- HEBEI XIONGAN KECHENG INSPECTION AND CERTIFICATION CO., LTD. --.

Signed and Sealed this
Thirteenth Day of August, 2024

Katherine Kelly Vidal
*Director of the United States Patent and Trademark Office*